(12) United States Patent
Negri et al.

(10) Patent No.: US 11,873,729 B2
(45) Date of Patent: Jan. 16, 2024

(54) TURBOFAN ENGINE COMPRISING A DEVICE FOR REGULATING THE FLOW RATE OF COOLING FLUID

(71) Applicant: SAFRAN AIRCRAFT ENGINES, Paris (FR)

(72) Inventors: Arnaud Nicolas Negri, Moissy-Cramayel (FR); Thaïs Savanah Liliane Marie Smeets, Moissy-Cramayel (FR); Didier Jean-Louis Yvon, Moissy-Cramayel (FR); Frédéric François Jean-Yves Patard, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/907,141

(22) PCT Filed: Mar. 18, 2021

(86) PCT No.: PCT/FR2021/050443
§ 371 (c)(1),
(2) Date: Sep. 23, 2022

(87) PCT Pub. No.: WO2021/191528
PCT Pub. Date: Sep. 30, 2021

(65) Prior Publication Data
US 2023/0107761 A1    Apr. 6, 2023

(30) Foreign Application Priority Data

Mar. 24, 2020  (FR) ..................................... 2002873

(51) Int. Cl.
*F01D 5/08* (2006.01)
*F01D 17/14* (2006.01)
(Continued)

(52) U.S. Cl.
CPC .............. *F01D 5/08* (2013.01); *F01D 17/14* (2013.01); *F01D 25/12* (2013.01); *F02C 7/18* (2013.01);
(Continued)

(58) Field of Classification Search
CPC .............................. F01D 17/141; F01D 25/12
See application file for complete search history.

(56) References Cited

U.S. PATENT DOCUMENTS 3,584,458 A    6/1971  Wetzler
4,296,599 A *  10/1981 Adamson .................. F02C 7/18
                                                      415/116
(Continued)

FOREIGN PATENT DOCUMENTS

| FR | 2 452 599 A1 | 10/1980 |
| GB | 2 246 836 A | 2/1992 |
| GB | 2 445 237 A | 7/2008 |

OTHER PUBLICATIONS

English translation of Written Opinion dated May 10, 2021, issued in corresponding International Application No. PCT/FR2021/050443, filed Mar. 18, 2021, 7 pages.
(Continued)

*Primary Examiner* — Courtney D Heinle
*Assistant Examiner* — John S Hunter, Jr.
(74) *Attorney, Agent, or Firm* — CHRISTENSEN O'CONNOR JOHNSON KINDNESS PLLC (57) ABSTRACT

A turbofan engine has a primary duct, in which there flows a primary flow at a primary pressure and a secondary duct, which radially surrounds the primary duct and in which there flows a secondary flow at a secondary pressure. The primary duct includes at least one compressor configured to compress the primary flow, a turbine driving the compressor in rotation and a combustion chamber designed to receive, at an inlet, the primary air flow compressed by the compressor. The turbomachine further includes a cooling circuit extending between the compressor and the turbine. The cooling circuit has an air flow rate regulating device arranged upstream of the turbine and having at least one valve that is configured to move between an open position
(Continued)

and a closed position, located between the compressor and the combustion chamber in the primary duct and the pressure (PS) in the secondary duct.

15 Claims, 9 Drawing Sheets

(51) Int. Cl.
    *F01D 25/12*     (2006.01)
    *F02C 7/08*     (2006.01)
    *F02C 7/18*     (2006.01)

(52) U.S. Cl.
    CPC ...... *F05D 2220/32* (2013.01); *F05D 2240/12* (2013.01); *F05D 2240/20* (2013.01); *F05D 2260/232* (2013.01)

(56) References Cited

U.S. PATENT DOCUMENTS

| | | |
|---|---|---|
| 4,807,433 A | 2/1989 | Maclin et al. |
| 2005/0132711 A1 | 6/2005 | Morgan et al. |
| 2012/0031105 A1 | 2/2012 | Thiyagarajan et al. |

OTHER PUBLICATIONS

International Preliminary Report on Patentability dated Sep. 22, 2022, issued in corresponding International Application No. PCT/FR2021/050443, filed Mar. 18, 2021, 8 pages.
International Search Report dated May 10, 2021, issued in corresponding International Application No. PCT/FR2021/050443, filed Mar. 18, 2021, 7 pages.
Written Opinion dated May 10, 2021, issued in corresponding International Application No. PCT/FR2021/050443, filed Mar. 18, 2021, 7 pages.

* cited by examiner

TURBOFAN ENGINE COMPRISING A DEVICE FOR REGULATING THE FLOW RATE OF COOLING FLUID

TECHNICAL FIELD OF THE INVENTION

The present invention relates to the field of turbomachines, and in particular the cooling of a turbomachine turbine rotor.

More particularly, the present invention relates to the regulation of the flow of a fluid through a rotor element of said turbomachine.

PRIOR ART

Conventionally, turbomachines of the turbofan engine type are known including an inlet sleeve receiving the air which is sucked in by a low pressure compressor to then be divided into a central primary flow and a secondary flow surrounding the primary flow. The low pressure compressor is similar to a fan in that a portion of the air flow it compresses feeds a secondary flow.

The secondary flow flows in a space called secondary duct which is delimited externally by a secondary duct casing also called engine fairing, and internally by an envelope surrounding the primary flow.

The primary flow flows in a space called primary duct delimited externally by the envelope and internally by a succession of stationary and rotating internal elements. The stationary internal elements comprise rectifier and distributor platforms, and inner casing shrouds, and the rotating internal elements comprise rotor bladed wheel platforms.

More concretely, the primary flow flows between an internal casing and an external casing of a high pressure compressor to be compressed in this high pressure compressor before being burned in a combustion chamber. It is then expanded through a high pressure turbine to drive the high pressure compressor, then through a low pressure turbine to drive the low pressure compressor, before being expelled rearward generating thrust.

The envelope delimiting the primary duct on the outside is thus formed by a series of casings comprising a high pressure compressor casing, a casing at the combustion chamber and a high pressure turbine casing, as well as by an external shroud of an exhaust casing.

Each turbine and each compressor are formed of stages each including a series of rotating blades regularly spaced around a central longitudinal axis of the engine, optionally preceded by a distributor in the case of a turbine or possibly followed by a rectifier in the case of a compressor. The distributors and the rectifiers consist of a series of stationary blades.

The rear portion of such an engine comprises, downstream of the low pressure turbine, an exhaust casing which carries a bearing supporting a rear end of the engine rotor. This exhaust casing includes an inner shroud and an outer shroud and radial arms securing these shrouds to one another, radially crossing the primary duct.

Aircraft turbomachines are also known, of the turbofan engine and twin-spool turbine type. In a known manner, the turbomachine includes, from upstream to downstream in the direction of flow of the gas flows in the turbomachine, a fan, coupled to a gas turbine engine including a low pressure compressor, a high pressure compressor, an annular combustion chamber, a high pressure turbine and a low pressure turbine.

The rotors of the high pressure compressor and the high pressure turbine are connected by a high pressure (HP) shaft and together form a high pressure body. The rotors of the low pressure compressor and the low pressure turbine are connected by a low pressure shaft (LP) and together form a low pressure body. The shafts HP and LP extend along a longitudinal axis of the turbomachine.

The fan includes vanes which are connected to a fan shaft. It is advantageous to rotate the fan at a rotational speed lower than that of the shaft LP, in particular when the latter is very large, in order to better adapt it aerodynamically. For this purpose, the fan shaft is connected in rotation to the shaft LP by means of a reducer, for example of the planetary gear type. In another configuration the fan shaft can be directly connected to the shaft LP.

The turbomachine also comprises a fan casing which extends around the vanes which is carried by aerodynamic arms, and which defines an air inlet duct for the flows. A portion of this air enters an internal annular duct of flow of a primary flow and the other portion feeds an external annular duct of flow of a secondary flow. The duct passes through the compressors LP and HP, the combustion chamber, and the turbines HP and LP. The external duct envelops compressor casings and turbines and joins the internal duct at a nozzle of the turbomachine.

In order to increase the thrust of the turbomachine, it is known to increase the size of the turbomachine, which has the disadvantage of increasing the mass and the space requirement of the turbomachine.

It is also known to increase the power and the thermal efficiency of the turbomachine by increasing the temperature of the combustion gases transmitted to the fins of the turbine. However, the increase in gas temperature is limited by the maximum allowable temperature of the turbine rotor and blades. In addition, the increase in temperature considerably reduces the lifespan of the elements located downstream of the combustion chamber, such as distributors or turbine blades, which generates significant maintenance costs.

In order to find a satisfactory compromise between mechanical features and acceptable lifespans, the various elements of the turbine, and in particular the rotor subjected to high temperatures, are traversed by a cooling fluid, such as ventilation air. Thus, the blades of the high pressure turbine are ventilated in order to be able to accept very high temperatures.

However, the cooling or ventilation air must be used at a pressure higher than that of the primary duct in the high pressure turbine. This air is generally taken from the outlet of the high pressure compressor and will not enter the combustion chamber, which has the effect of reducing the amount of air available for the combustion chamber of the turbomachine, and thus reducing the thermal efficiency of the turbomachine.

It is therefore necessary to limit the air intakes necessary for ventilation in order to improve the thermal efficiency of the turbomachine.

Among the known ventilation circuits, some comprise an active system for controlling the ventilation flow rate of a high pressure turbine configured to take the flow rate of air necessary for ventilation according to the needs of the turbomachine. Such a system generally comprises a plurality of open tubes located in front of the outlet of the high pressure compressor and the opening of which is controlled by means of one or more actuators in order to take air from the outlet of the high pressure compressor to inject it towards the high pressure turbine disc.

However, such an active system requires the integration of actuators and a dedicated control unit, which is particularly bulky and costly. Devices configured to control the flow of a fluid through a rotor element according to the rotational speed of the latter are also known. Reference may be made in this respect to document FR 2 943 094 (Snecma) which discloses a closure element configured to deform under the action of a centrifugal force induced by the rotation of the rotor. The closure element is angularly movable around a transverse axis perpendicular to the axis of rotation of the rotor. In the rest position, the closure element is substantially flared from upstream to downstream. When the turbomachine is rotating, the closure element deforms under the effect of the force from downstream to upstream so as to close off the passage of the cooling air flow in the turbomachine.

Such a closure element does not allow the cooling air flow to increase when the rotational speed of the rotor increases, which does not meet the cooling needs of the turbomachine.

Thus, there is a need to provide a device configured to passively regulate the cooling air flow rate according to the necessary air requirements.

DISCLOSURE OF THE INVENTION

The purpose of the present invention is therefore to overcome the disadvantages of the aforementioned systems and to propose a device for regulating the flow rate of air flowing in a turbomachine rotor according to the air requirements necessary to cool at least one element of the turbomachine, without adding actuators and a control system, in order to optimise the overall performance of the turbomachine.

The object of the invention is therefore a turbomachine, with a longitudinal axis, comprising a primary duct in which there flows a primary flow at a primary pressure and a secondary duct which radially surrounds the primary duct and in which there flows a secondary flow at a secondary pressure, said primary duct including at least one compressor configured to compress the primary flow, a turbine driving said compressor in rotation and a combustion chamber designed to receive, at an inlet, the primary air flow compressed by the compressor.

Said turbomachine further comprises a cooling circuit extending between the compressor and the turbine and in which flows a flow of cooling air taken from the outlet of the compressor and having as pressure the primary pressure.

The cooling circuit comprises an air flow rate regulating device arranged upstream of the turbine and comprising at least one valve that is able to move between an open position and a closed position depending on the pressure difference between the pressure in the primary duct located between the compressor and the combustion chamber and the pressure in the secondary duct.

In other words, the valve is able to move between an open position and a closed position depending on the pressure difference between the pressure of the cooling air flow flowing in the cooling circuit and the pressure in the secondary duct.

In the secondary duct, once past the rectifier blading located downstream of the fan and at the secondary flow inlet, the pressure is almost uniform to the nozzle. It is thus possible to approximate the pressure to a secondary duct pressure, in particular the pressure located between the downstream of the fan rectifier to the upstream of the exhaust nozzle.

The air flow regulating device thus allows to passively regulate the flow rate of air flowing in the turbine rotor elements by modulating the air intake according to the cooling requirements of the turbomachine.

The turbomachine may be a turbofan engine or a twin-spool engine comprising a fan.

Moreover, the air flow regulating device may be intended to regulate the air flow rate in a blade of a high pressure or low pressure turbine.

Advantageously, the air flow rate regulating device is configured to ensure a minimum air flow rate when the pressure difference between the primary pressure and the secondary pressure is less than a threshold value and to ensure a maximum air flow rate when the pressure difference between the primary pressure and the secondary pressure is greater than or equal to the threshold value.

For example, the threshold value from which the pressure difference allows to increase the air flow rate can be comprised between and 40 bars.

However, it will be noted that this threshold value depends on the general parameters of the turbomachine and particularly on its maximum compression ratio, acronym "OPR" and its secondary flow compression ratio, acronym "FPR". With a turbomachine designed, for example, with a maximum compression ratio equal to 60 and a secondary flow compression ratio equal to 1.5, the threshold value can be greater than 30, for example 40 bars. With a turbomachine designed, for example, with a maximum compression ratio equal to 20 and a secondary flow compression ratio equal to 5, the threshold value can be less than 20 bars, for example equal to 10 bars.

The air flow rate regulating device may comprise an annular cowl for calibrating the ventilation flow rate mounted in the cooling circuit at the downstream end of said circuit upstream of the turbine rotor and integral with the stator portion of the turbomachine, for example the casing of the combustion chamber, the valve being mounted in said cowl.

According to one embodiment, the cowl comprises at least one longitudinal passage orifice opening into the cooling circuit, the valve being mounted downstream of said passage orifice.

The passage orifice is, for example, formed in an upstream surface of the cowl.

For example, the valve comprises a cylindrical housing, a cylinder movable in translation in said housing along an axis parallel to the axis of rotation of the turbine rotor, between the closed position of the valve wherein the cylinder closes the passage orifice and the open position of the valve wherein the cylinder allows the passage of an air flow through the passage orifice. Said housing is connected directly or indirectly to a secondary pressure supply tube opening into the secondary duct.

For example, the cylinder comprises an upstream end having a pointed shape towards the upstream. Such a shape has the advantage of allowing the self-centring of the cylinder in the associated passage orifice.

The end of the secondary pressure supply tube opening into the secondary duct is, for example, oriented downstream in order to capture only the static pressure in the secondary duct and not the impurities which may be present in said secondary duct.

Ideally, there is no air flow in the secondary pressure supply tube. In order to avoid or limit ventilation air leaks into the secondary duct, the valve may comprise sealing elements mounted between the external cylindrical surface of the cylinder and the internal cylindrical surface of the housing. The sealing elements can, for example, be O-ring seals or U-type hydraulic seals or any type of element preventing the passage of fluid to the secondary duct.

For example, the upstream end of the cylinder comprises an axial stop against the end of the housing in the open position of the valve and against the upstream surface of the cowl in the closed position of the valve. Thus, the cylinder is held in the housing. For example, the axial bearing has the shape of an annular flange. Alternatively, provision can be made of any other form forming an axial stop of the cylinder.

Advantageously, the valve comprises an elastic member configured to pre-load the cylinder in the closed position of the valve, such as for example a spring, housed in said housing and cooperating with a downstream end of the cylinder. Said elastic member is dimensioned to prevent the translational movement of the cylinder in the closed position of the valve when the pressure difference between the pressure in the primary duct and the secondary pressure in the secondary duct is less than the threshold value, for example when the engine is lightly loaded.

When the pressure difference between the pressure in the primary duct and the pressure in the secondary duct is greater than or equal to the threshold value, the pre-load force of the elastic member is countered and the cylinder is moved in translation towards the upstream in the open position of the valve.

The term "elastic member" means any elastic member, by virtue of the material used and/or its dimensions, capable of deforming elastically, in a reversible manner, under the action of a load exerted by the pressure difference between the pressure in the primary duct and the secondary pressure in the secondary duct and to return to its initial position after stopping said load.

The cowl may comprise an annular chamber into which the secondary pressure supply tube opens.

For example, the flow rate regulating device further comprises a secondary pressure supply conduit connected to the annular distribution chamber and to the cylindrical housing of the valve, said secondary pressure supply conduit being configured to convey the secondary flow in the cylindrical housing of the valve.

The cowl may also comprise at least one channel extending between the passage orifice and the turbine rotor to allow the passage of an air flow coming from the passage orifice towards said turbine rotor.

According to another embodiment, the cowl, and in particular its upstream surface, comprises a plurality of longitudinal passage orifices, for example, regularly distributed circumferentially, opening into the cooling circuit.

The passage orifices can have the same size or alternatively different dimensions to further regulate the air flow rate.

For example, the air flow rate regulating device comprises a plurality of valves each configured to be actuated depending on the pressure difference between the pressure in the primary duct and the pressure in the secondary duct, each valve being mounted in the cowl downstream of an associated passage orifice.

The number of valves can be less than the number of passage orifices. For example, and in a non-limiting manner, half the passage orifices of the cowl are associated with a valve. The other half of the passage orifices of the cowl is therefore permanently open.

Alternatively, provision could be made for a single passage orifice to be associated with a valve or, conversely, for all the passage orifices to be associated with a valve. The latter case is particularly advantageous so as not to ventilate the turbine blades when the engine speed is at idle.

The elastic members of the valves can be identical to each other. Alternatively, provision could be made of elastic members, for each valve, which are different and configured so that the valves are actuated in the open position one after the other as the pressure difference increases, thus allowing to have a progressive increase in the ventilation air flow rate. Thus, the valve can have a non-progressive opening and closing or progressive opening and closing.

In the case where the air flow rate regulating device comprises a plurality of valves, the pressure supply conduit allows to convey the secondary flow into all the cylindrical housings of the valves.

Advantageously, the turbine rotor comprises a turbine disc whose axis of symmetry is coaxial with the axis of rotation, at least one rotor blade mounted radially on the circumference of said turbine disc and a sealing disc having the general shape of an annular portion whose axis of symmetry is coaxial with the axis of rotation of the rotor, arranged upstream and integral in rotation with said rotor disc. The rotor blades extend radially outward.

For example, the cooling circuit opens into a cooling volume arranged between the sealing disc and the upstream surface of the turbine disc, the sealing disc comprising at least one ventilation orifice opening into the channel.

Thus, an air flow is taken upstream of the combustion chamber at the outlet of the compressor to be introduced into said cooling volume.

Alternatively, the sealing disc comprises a plurality of angularly and regularly distributed ventilation orifices.

The ventilation orifices allow the passage of a flow of air taken, for example, by an air injector into the cooling volume. The cooling air flow is then distributed to the blades mounted on the turbine disc. The ventilation orifices are configured to allow sufficient air flow rate to cool the turbine blades when the turbomachine is operating at full speed, in particular during the take-off phases of the aircraft and when the gas temperature is very high.

The air injector allows to drive the cooling air flow in rotation so that said air flow flows more easily from the stator reference frame to the rotor reference frame. Indeed, the flow of cooling air flows along a substantially axial axis at the upstream face of the cowl and in the passage orifices. However, this air flow must flow through the ventilation orifices made in a part with a high rotational speed. The air injector, which is a part fixed to the stator between said passage and ventilation orifices, allows, thanks to fins, to force the axial air flow to move more naturally towards the rotating ventilation orifices. These air injectors are known to the person skilled in the art and will not be described further.

BRIEF DESCRIPTION OF THE DRAWINGS

Other purposes, features and advantages of the invention will appear upon reading the following description, given only by way of non-limiting example, and made with reference to the appended drawings wherein:

FIG. 2

FIG. 5

In the rest of the description, the terms "upstream" and "downstream" are defined with respect to the direction of air flow in the turbomachine.

DETAILED DESCRIPTION OF AT LEAST ONE EMBODIMENT

Figure 1:
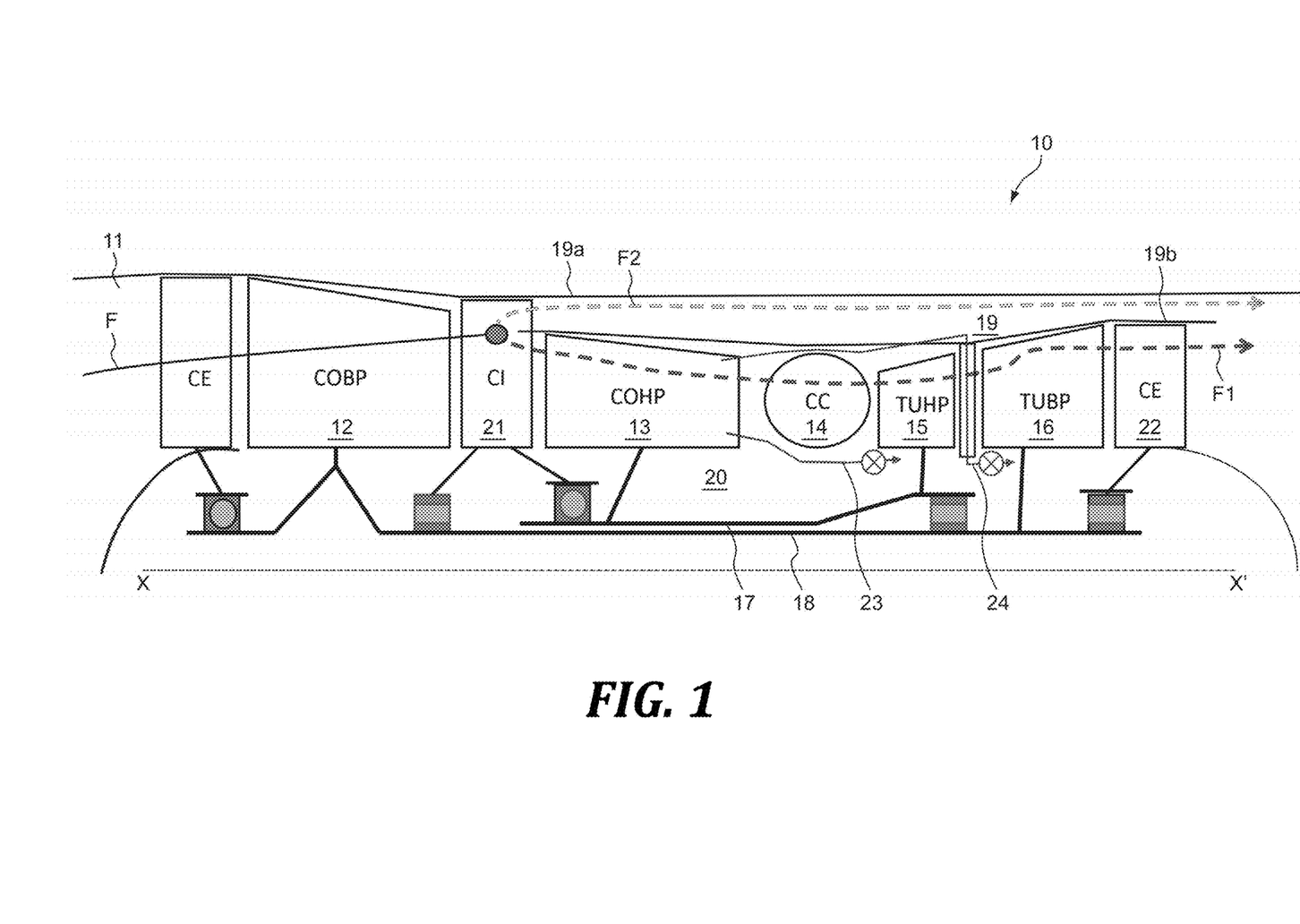
FIG. 1 schematically illustrates an axial half-section of a structure of an example of a turbomachine comprising an air flow rate regulating device according to a first embodiment of the invention.

FIG. 1 very schematically shows an axial half-section of a turbomachine 10, with a general longitudinal axis X-X', for example of the turbofan engine type. The turbomachine comprises, from upstream to downstream in the flow direction of the air flow F, an inlet sleeve 11 receiving air, a low pressure compressor 12 (COPB) configured to suck in the air flow F and divide it into a central primary flow F1 at a first variable pressure and a secondary flow F2 at a secondary pressure which radially surrounds said primary flow F1. The low pressure compressor 12 can be connected to a fan in so far as a portion of the air flow that it compresses allows to feed the secondary flow. The turbomachine further comprises a high pressure compressor 13 configured to receive the primary air flow F1 from the low pressure compressor 12, an annular combustion chamber 14, a high pressure turbine 15 and a low pressure turbine 16.

The rotors of the high pressure compressor 13 and the high pressure turbine 15 are connected by a high pressure shaft 17. The rotors of the low pressure compressor 12 and the low pressure turbine 16 are connected by a low pressure shaft 18.

The secondary flow F2 flows in a space 19 called the secondary duct delimited externally by a secondary duct casing 19a or fairing of the engine and internally by an envelope 19b which radially surrounds the primary flow F1.

The primary flow F1 flows in a space 20 called the primary duct delimited externally by the envelope 19b and internally by a succession of fixed and rotating elements.

The primary flow F1 flows between an internal casing 21 located downstream of the low pressure compressor 12 and an exhaust casing 22 downstream of the low pressure turbine 16.

The primary and secondary ducts 19, 20 meet downstream of the exhaust casing 22.

As illustrated in FIG. 1, the turbomachine 10 comprises a first cooling circuit 23 of the high pressure turbine 15 taking air from the high pressure compressor 13 and a second cooling circuit 24 of the low pressure turbine 16 taking air from the high pressure compressor 13.

It will be noted that the turbomachine could comprise one or the other of said cooling conduits, or even both.

The low pressure compressor 12 or the fan in the case of a turbofan and twin-spool engine creates a pressure PS called "secondary pressure" in the secondary duct 19.

Figure 2:
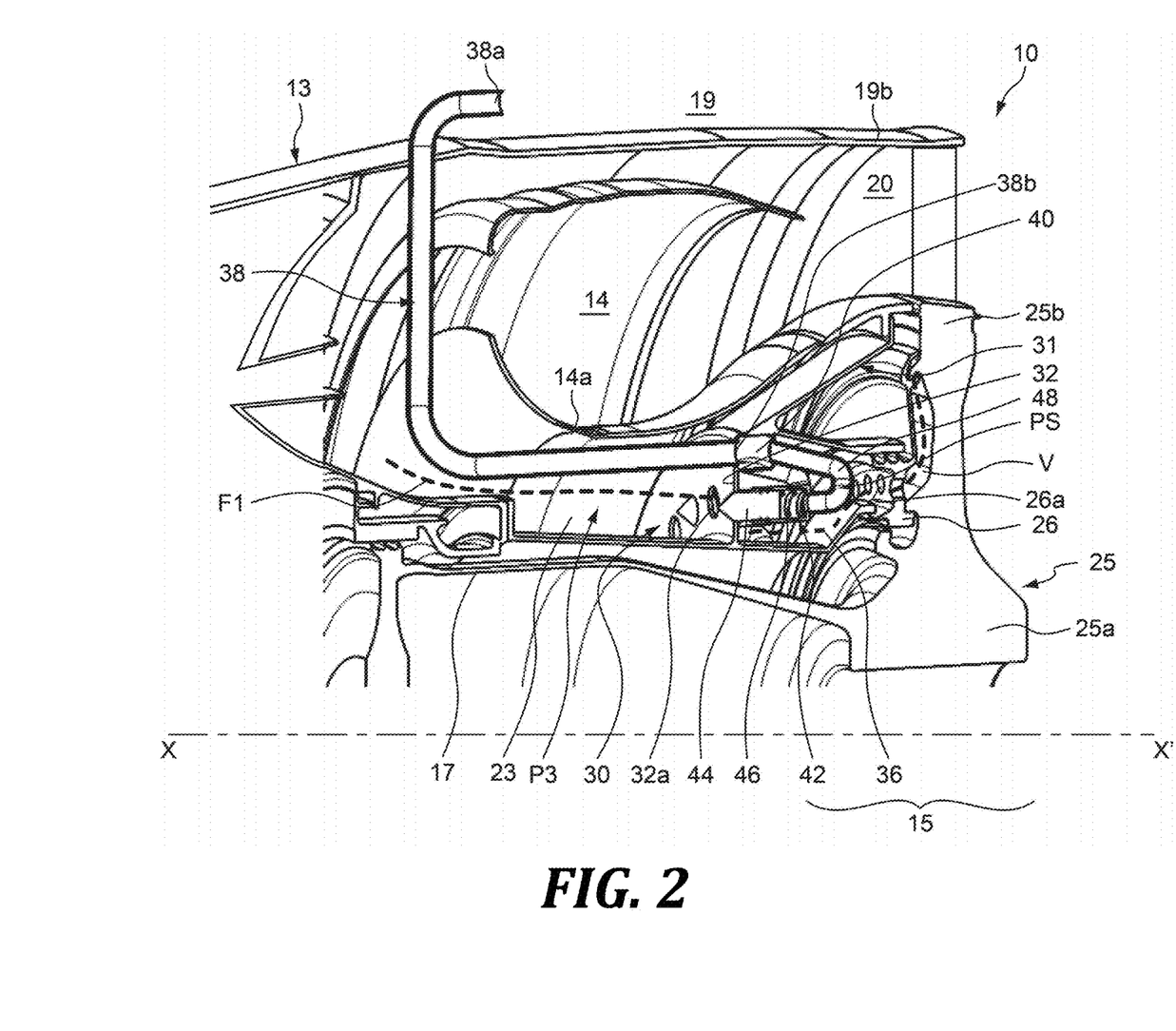
Figure 3:
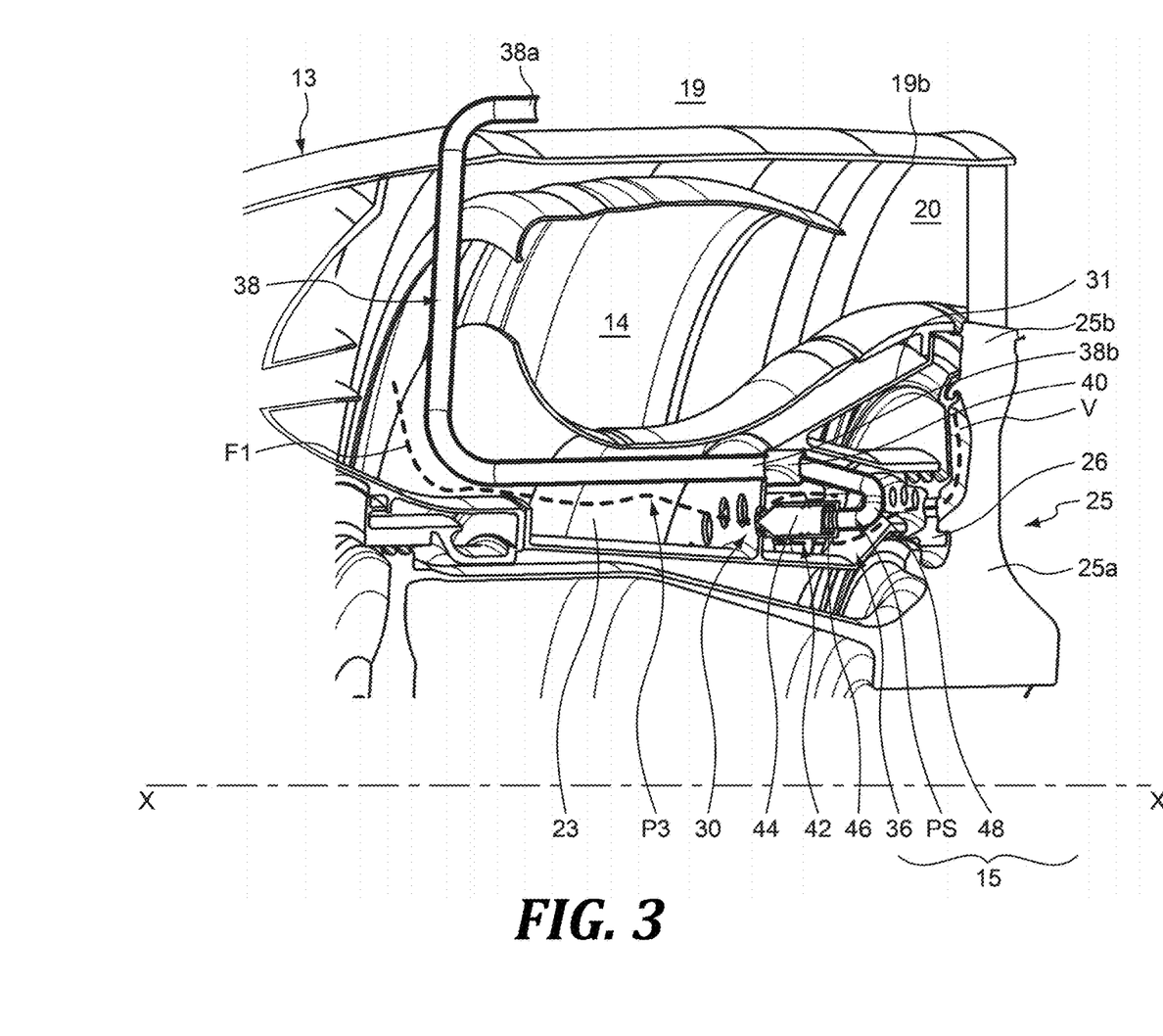
FIG. 3 very schematically illustrate the upper half of a portion of the high pressure body of the turbomachine of FIG. 1 comprising an air flow rate regulating device according to one embodiment of the invention comprising a valve respectively in a closed position and an open position.
Figure 4:
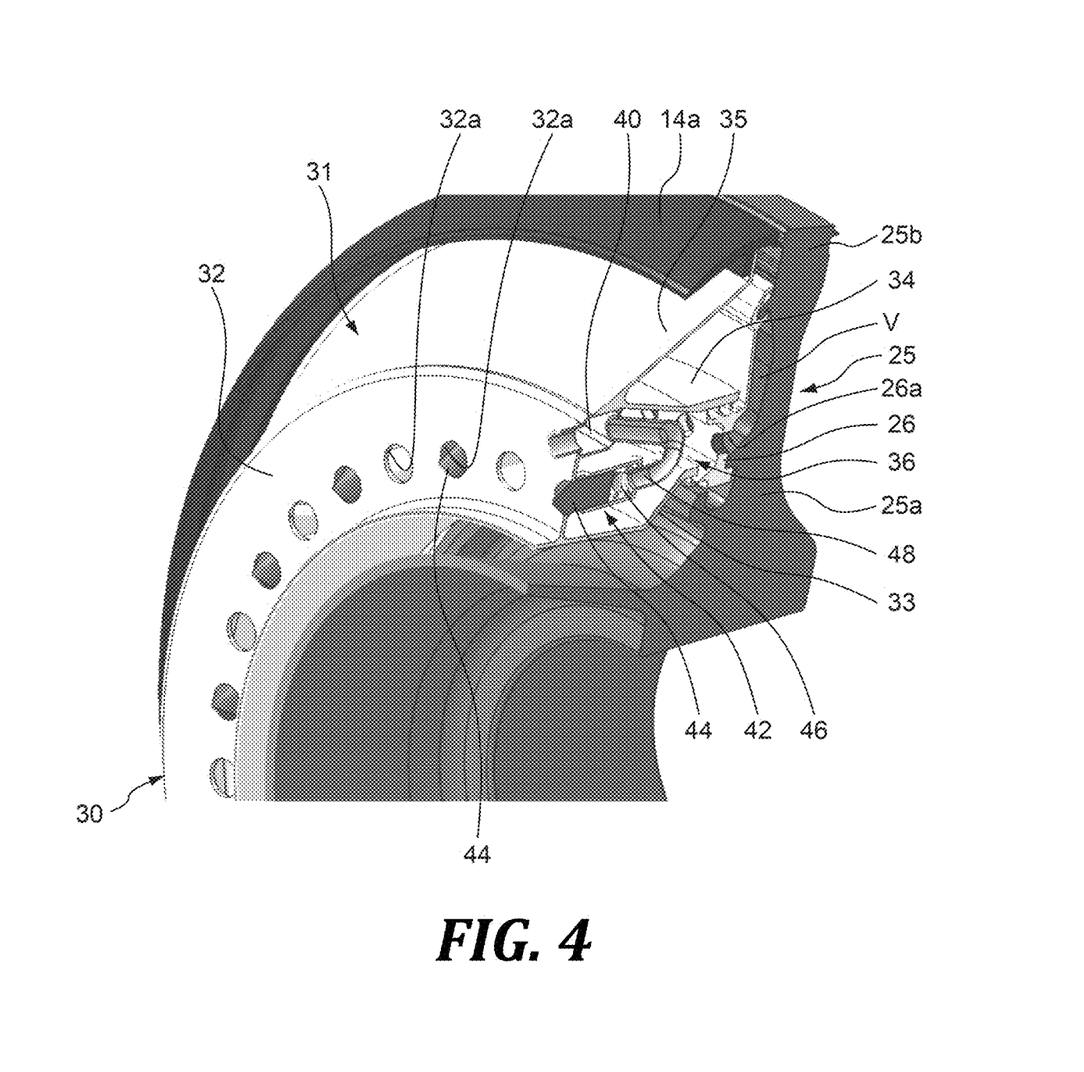
FIG. 4 illustrates in detail the air flow rate regulating device of FIGS. 2 and 3.
Figure 8:
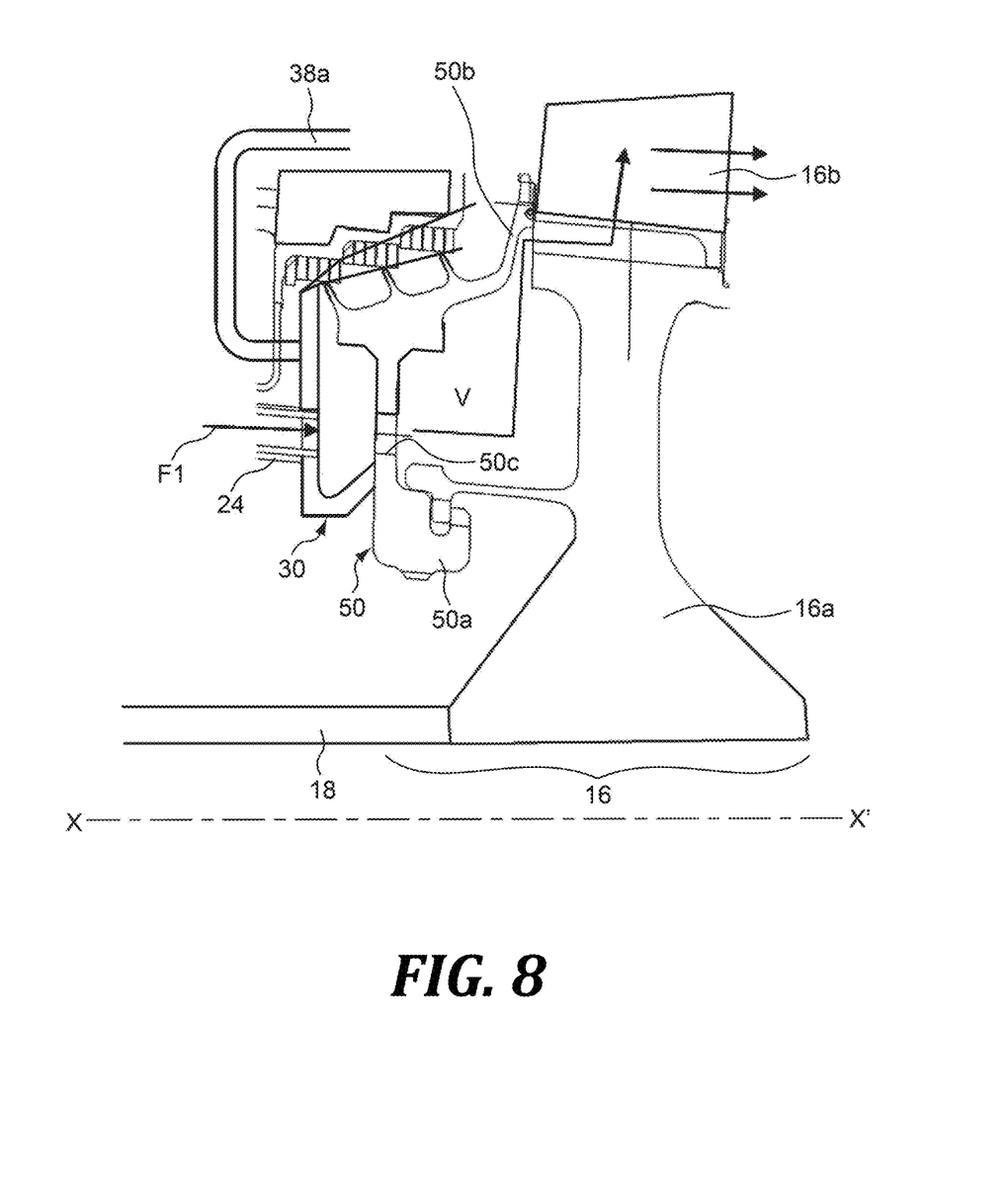
FIG. 8 very schematically illustrates the upper half of a portion of the low pressure body of the turbomachine of FIG. 1 wherein the air flow rate regulating device according to the invention could be integrated.

FIGS. 2 and 3 very schematically show an upper half of a portion of the high pressure body of a turbomachine 10, for example the turbomachine of FIG. 1. It will be noted that the regulation device could also be integrated into the low pressure body of a turbomachine, as shown in FIG. 8.

The high pressure body of the turbomachine, with a general longitudinal axis X-X', comprises a casing 19b forming the envelope of the secondary duct 19 and enclosing the high pressure compressor 13 of which only the compressor diffuser has been shown, the combustion chamber 14 receiving as input the hot air compressed by said compressor 13, and the high pressure turbine.

The high pressure turbine 15 comprises a turbine rotor 25, with an axis of rotation X-X', comprising a turbine disc 25a whose axis of symmetry is coaxial with the axis of rotation X-X'. The turbine disc 25a comprises an axial bore (not referenced) from which extends the drive shaft 17 connected to the compressor 13 to drive it in rotation in a primary duct 20. The turbine disc 25a further comprises a plurality of rotor blades 25b mounted radially around the circumference of said turbine disc 25a. The rotor blades 25b extend radially outward.

The turbine 15 further comprises a sealing disc 26 configured to provide sealing between the rotor 25 and the stator upstream of the turbine 15. The sealing disc 26 is commonly referred to as a "maze disc".

The sealing disc 26 is in the general shape of an annular part whose axis of symmetry is coaxial with the axis of rotation X-X'. The sealing disc 26 is mounted upstream of the turbine disc 25a and integral in rotation with the latter.

The cooling circuit 23 of the turbomachine 10 extends between the high pressure compressor 13 and the high pressure turbine 15. The cooling circuit 13 opens into a cooling volume V provided between the downstream surface of the sealing disc 26 and the upstream surface of the turbine disc 25a. Thus, an air flow is taken upstream of the combustion chamber 14 at the outlet of the compressor 13 to be introduced into said cooling volume V. To this end, the sealing disc 26 comprises a plurality of ventilation orifices 26a opening into the thickness of said sealing disc 26. The ventilation orifices 26a are angularly and regularly distributed over the upstream surface of said sealing disc 26.

The ventilation orifices 26a allow the passage of a flow of air F1 sampled, for example, by an air injector (not shown) in the cooling volume V. The cooling air flow is then distributed to the blades 25b mounted on the turbine disc 25a. The ventilation orifices 26a are configured to allow sufficient air flow rate to cool the blades 25b when the turbomachine is operating at full speed, in particular during the take-off phases of the aircraft and the gas temperature is very high. At cruising speed, when the gas temperature is lower and the cooling requirements are reduced, it is advantageous to regulate the flow rate of the cooling air flow.

To this end, the cooling circuit 23 comprises an air flow rate regulating device 30. The air flow rate regulating device 30 comprises an annular cowl 31 for calibrating the ventilation flow rate mounted in the cooling circuit 23 at the downstream end of said circuit directly upstream of the turbine disc 25a. The cowl 31 is secured to the stator, in particular to the casing 14a of the combustion chamber 14.

As illustrated, the cowl 31 is delimited by an upstream radial surface 32, an inner annular surface 33 connected upstream to the upstream radial surface 32 and supporting an internal seal downstream with the sealing disc 26, an intermediate annular surface 34 connected upstream to the upstream radial surface 32 and supporting downstream an external seal with the sealing disc 26 and an external annular surface connected upstream to the upstream radial surface 32 and connected downstream to the stator, in particular to the casing 14a of the combustion chamber 14.

The upstream radial surface 32 comprises a plurality of longitudinal passage orifices 32a opening into the thickness of the upstream surface 32. In a non-limiting manner, the passage orifices 32a can be circumferentially regularly distributed over the upstream surface 32 of the cowl 31.

The cowl 31 further comprises a channel 36 located axially between the upstream surface 32 and the downstream end of the sealing disc 26 and radially between the inner annular surface 33 and the intermediate annular surface 34 of the cowl 31. The channel 36 allows the passage of the air flow F1 coming from the passage orifices 32a towards the sealing disc 26 and thus into the cooling volume V through the ventilation orifices 26a of said disc 26.

The air flow rate regulating device 30 further comprises a secondary pressure PS supply tube 38 comprising an end 38a opening into the secondary duct 19 and an end 38b connected to the cowl 31 and opening in particular into an annular chamber 40 mounted in said cowl 32. The end 38a opening into the secondary duct 19 is oriented downstream in order to pick up only the static pressure in the secondary duct 19 and not the impurities that may be present.

The air flow rate regulating device 30 further comprises a plurality of valves 42 each configured to be actuated depending on the pressure difference between the primary duct 20 and the secondary duct 19. Each valve 42 is mounted in the cowl 31 downstream of an associated passage orifice 32a.

As illustrated, and in a non-limiting manner, half of the passage orifices 32a of the cowl 31 is associated with a valve 42. The other half of the passage orifices 32a of the cowl 31 is therefore permanently open.

Alternatively, provision could be made for a single passage orifice 32a to be associated with a valve 42 or, conversely, for all the passage orifices 32a to be associated with a valve 42. The latter case is particularly advantageous so as not to ventilate the turbine blades when the engine speed is at idle.

Figure 5:
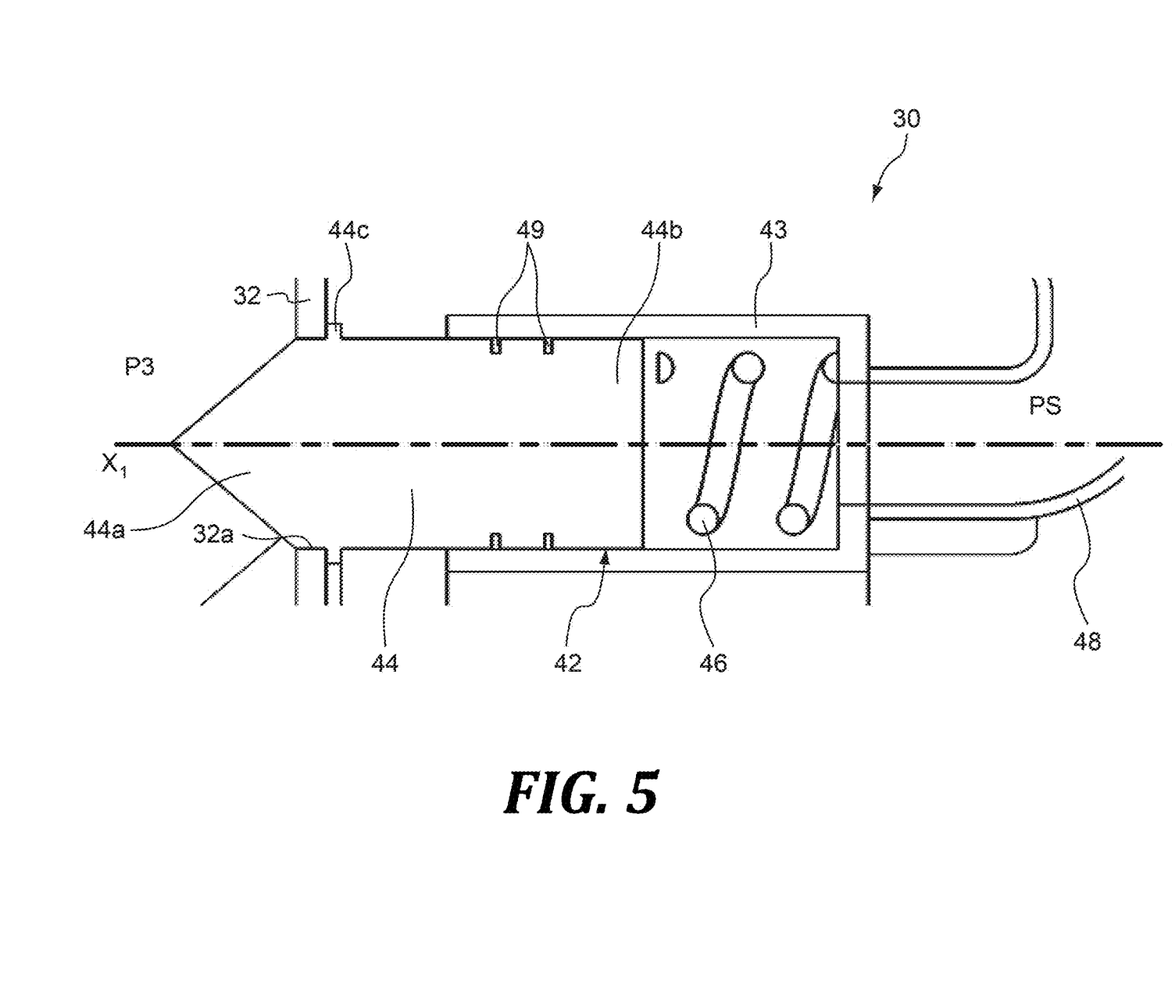
Figure 6:
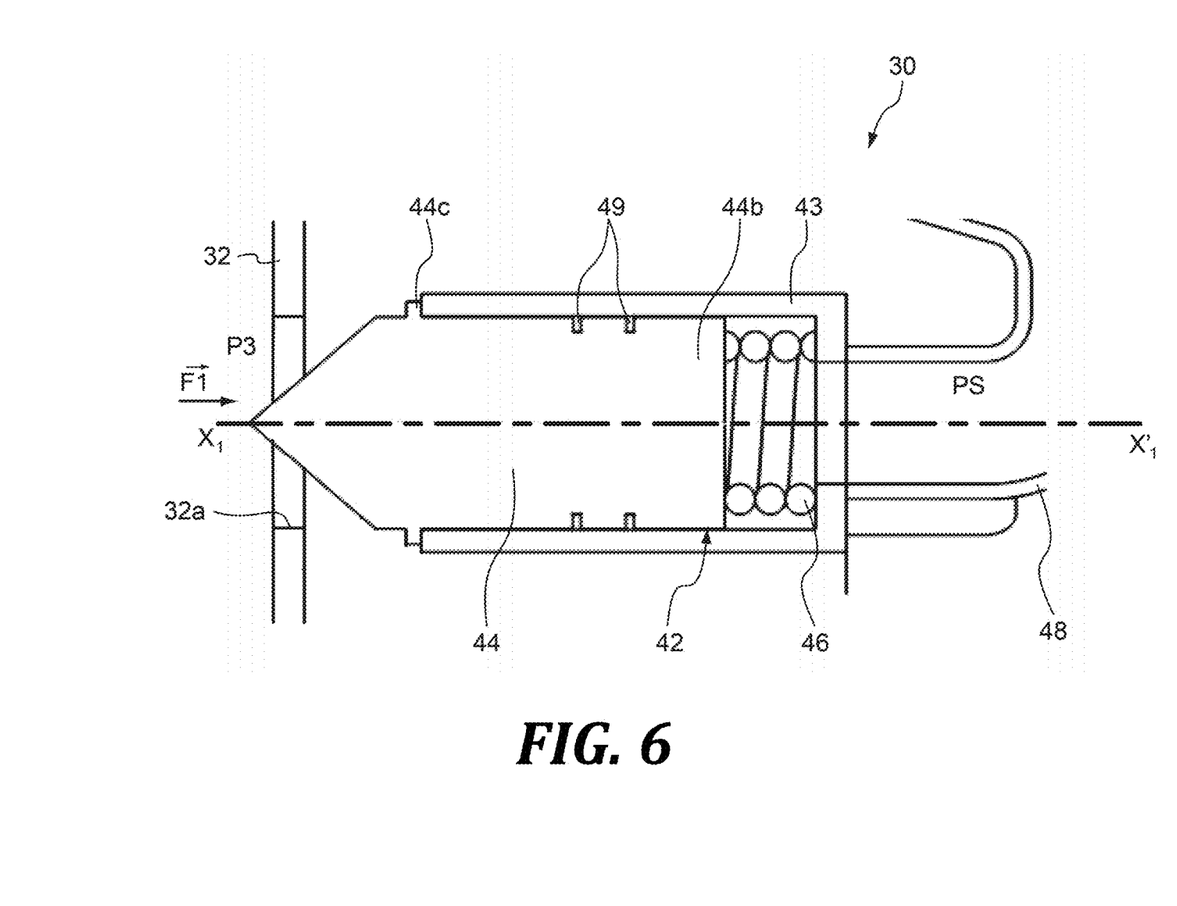
FIG. 6 are sectional views of the valve respectively in the closed position and the open position.
Figure 7:
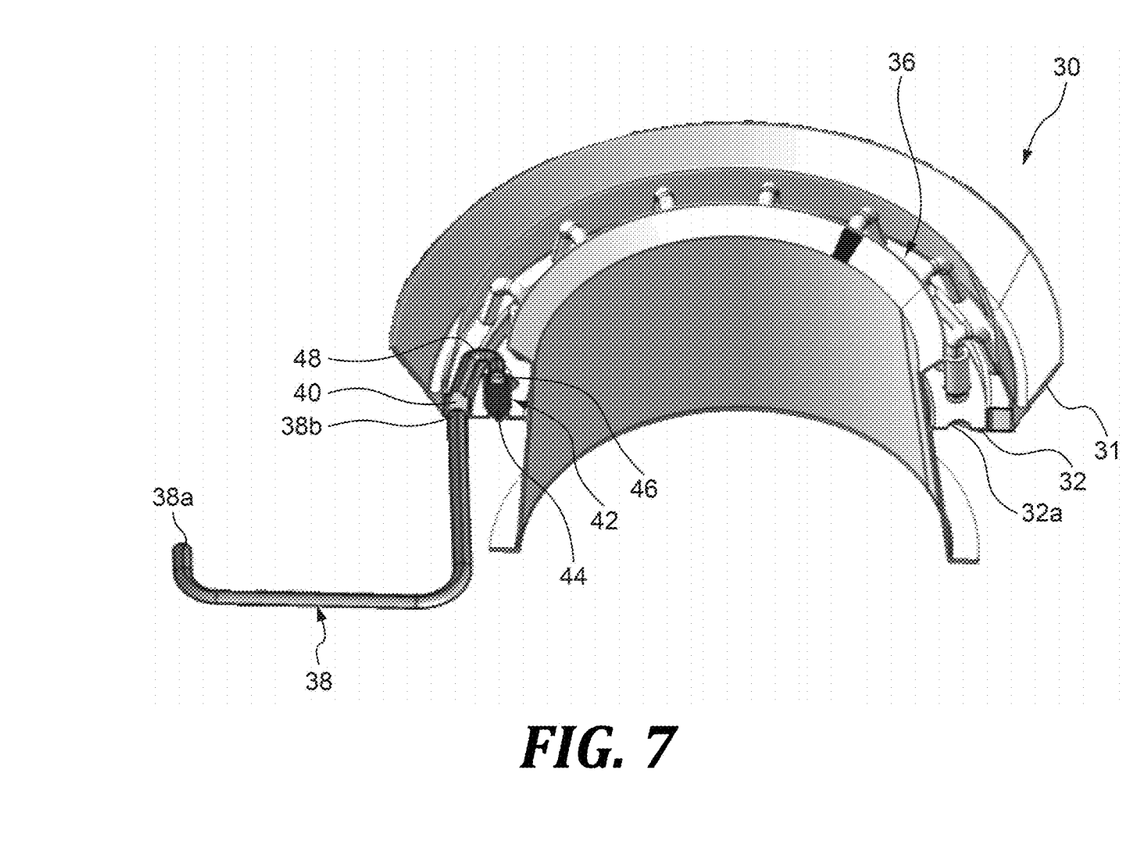
FIG. 7 illustrates the downstream face of the air flow rate regulating device of FIGS. 2 and 3.

Each valve 42 comprises a cylindrical housing 43, a cylinder 44 movable in translation in said housing 43 along an axis X1-X1' parallel to the axis X-X' of rotation, between a closed position of the valve, visible in FIGS. 2 and 5 and an open position of the valve, visible in FIGS. 3 and 6, and a spring 46 housed in said housing 43. In general, each valve 42 comprises an elastic member 46, such as for example a spring, configured to pre-load the cylinder 44 in the closed position of the valve 42.

The cylinder 44 comprises an upstream end 44a which opens into the associated passage orifice 32a and a downstream end 44b cooperating with the associated spring 46. As illustrated, the upstream end 44a has, in a non-limiting manner, a shape pointed towards the upstream. Such a shape has the advantage of allowing the self-centring of the cylinder 44 in the associated passage orifice 32a.

Each cylinder assembly 44 and its spring 46 is associated with a secondary pressure supply conduit 48 connected to the annular distribution chamber 40 and to the cylindrical housings 43 of each valve 42 in order to convey the secondary flow into all the cylindrical housings of the valves 42.

Each of the cylinders 44 is held in the closed position of the valve 42, visible in FIGS. 2 and 5, by an associated spring 46. In the closed position of the valve 42, the cylinders 44 block the passage of ventilation air through the associated passage orifice 32a in the channel 36 and thus in the cooling volume V.

The springs 46 are dimensioned to prevent the translational movement of the cylinder 44 upstream when the pressure difference ΔP between the pressure P3 in the primary duct and the pressure PS in the secondary duct is lower than a first threshold value S1, for example when the turbomachine is at idle. The pressure P3 is located between the high pressure compressor 13 and the combustion chamber 14.

For example, the threshold value S1 from which the pressure difference allows to increase the air flow rate can be comprised between and 40 bars.

However, it will be noted that this threshold value depends on the general parameters of the turbomachine and particularly on its maximum compression ratio, acronym "OPR" and its secondary flow compression ratio, acronym "FPR". With a turbomachine designed, for example, with a maximum compression ratio equal to 60 and a secondary flow compression ratio equal to 1.5, the threshold value can be greater than 30, for example 40 bars. With a turbomachine designed, for example, with a maximum compression ratio equal to 20 and a secondary flow compression ratio equal to 5, the threshold value can be less than 20 bars, for example equal to 10 bars.

Thus, when the pressure difference ΔP between the pressure P3 in the primary duct and the pressure PS in the secondary duct is greater than or equal to the first threshold value S1, the force of the spring 46 is countered and the cylinder 44 is moved in translation downstream, according to the arrow F visible in FIG. 6, in the open position of the valve 42 visible in FIGS. 3 and 6.

By way of non-limiting example, the opening of the valves could be progressive in the case where the springs 46 are different between the valves in order to start opening a passage orifice 32a from a first threshold value, then two passage orifices 32a from a second threshold value, greater than the first threshold value, and so on until all the valves from a last threshold value are open. These threshold values can be comprised between 10 and 40 bars. For example, the first threshold value can be equal to 30 bars, the second threshold value can be equal to 35 bars.

As illustrated, the passage orifices 32a are of identical size. Alternatively, passage orifices 32a of different sizes could be provided to regulate the air flow rate more finely.

Similarly, in the example illustrated, the springs 46 are identical to each other. It is possible to provide springs for each valve which are different and configured so that the valves are actuated in the open position one after the other as the pressure difference ΔP increases, thus allowing to have a progressive increase in the ventilation air flow rate.

Thus, the valve can have a non-progressive opening and closing or progressive opening and closing.

Ideally, there is no air flow in the secondary pressure supply tubes 38 and in the secondary pressure supply conduits 48. In order to avoid or limit ventilation air leaks towards the secondary duct 19, each valve 42 comprises sealing elements 49 between the external cylindrical surface (not referenced) of the cylinder 44 and the internal cylindrical surface (not referenced) of the housing 43. The sealing elements 49 can, for example, be O-ring seals or U-type hydraulic seals.

As illustrated in FIGS. 5 and 6, the upstream end 44a of the cylinder comprises an annular flange 44c forming an axial stop against the end of the housing 43 in the open position of the valve 42 and against the upstream surface 32 of the cowl 31 in the closed position of the valve 42. Thus, the cylinder 44 is held in the housing 43. Alternatively, provision could be made of any other embodiment forming an axial stop of the cylinder 44.

The air flow regulating device thus allows to passively regulate the flow rate of air flowing in the rotor elements by modulating the air intake according to cooling needs.

In general, the turbomachine comprises a valve actuated between a closed position and an open position depending on the pressure difference between the primary duct 20 and the secondary duct 19.

As illustrated in FIG. 8, the turbomachine 10 comprises a low pressure turbine stage 16 comprising a turbine rotor, with an axis of rotation X-X', comprising a turbine disc 16a of generally annular shape whose axis of symmetry is coaxial with the axis of rotation X-X'. The turbine disc 16a comprises an axial bore (not referenced) from which extends a drive shaft 18 and a plurality of rotor blades 16b mounted radially around the circumference of said turbine disc 16a. The rotor blades 16b extend radially outward.

The drive shaft 18 is intended to be connected to the rotor of a low pressure compressor 12 mounted upstream of the low pressure turbine rotor 16.

The turbine stage further comprises a sealing disc 50 configured to provide sealing between the rotor and the stator portion, comprising for example the casing of the combustion chamber (not shown) upstream of the turbomachine. The sealing disc 50 is commonly referred to as a "maze disc".

The sealing disc 50 is in the general shape of an annular part whose axis of symmetry is coaxial with the axis of rotation X-X'. The sealing disc 50 is mounted upstream of the turbine disc 16a and integral in rotation with the latter.

The sealing disc 50 comprises a radially inner fixing portion 50a connected upstream to an element (not referenced) of the turbine body and downstream to the turbine disc 16a. The sealing disc 50 is moreover axially preloaded so that its radially outer edge 50b bears axially against an upstream surface of the rim of the turbine disc 16a and thus prevents the blades 16b from moving.

A cooling volume V is arranged between the downstream surface of the sealing disc 50 and the upstream surface of the rotor turbine disc 16a. A flow of air, illustrated by an arrow F1 in FIG. 8, is taken upstream from the high pressure compressor 13 to be introduced into said cooling volume V. To this end, the sealing disc 50 comprises a plurality of ventilation orifices 50c opening into the thickness of said sealing disc 50. The ventilation orifices 50c are angularly and regularly distributed over the upstream surface of said disc 50.

The ventilation orifices 50c allow the passage of a flow of air taken from the high pressure compressor and conveyed by a cooling circuit 24 to the low pressure turbine casing. The cooling air flow is then distributed to the blades 16b mounted on the rotor turbine disc 16a.

The ventilation orifices 50c are configured to allow sufficient air flow rate to cool the turbine blades 16b when the turbomachine is operating at full speed, in particular during the take-off phases of the aircraft and the gas temperature is very high.

At cruising speed, when the gas temperature is lower and the cooling requirements are reduced, it is advantageous to regulate the cooling air flow rate.

For this purpose, the turbomachine 10 comprises the air flow rate regulating device 30 illustrated in detail in FIGS. 2 to 7. The air flow rate regulating device 30 comprises an annular cowl 31 for calibrating the ventilation flow rate mounted in the cooling circuit 24 at the downstream end of said circuit directly upstream of the turbine disc 16a. The cowl 31 is integral with the stator.

Figure 9:
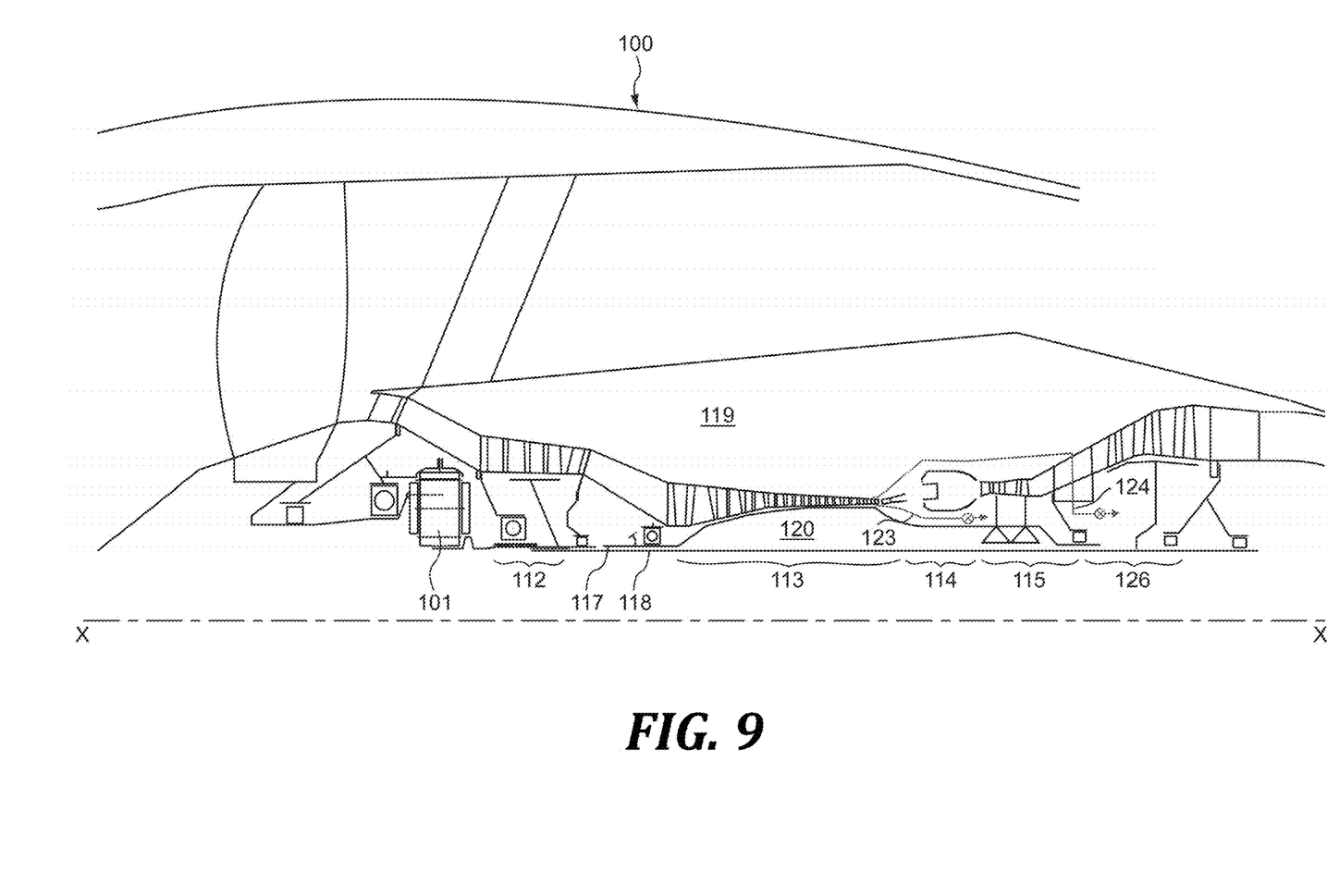
FIG. 9 schematically illustrates an axial half-section of a structure of another example of a turbomachine comprising the air flow rate regulating device.

It will also be noted that the invention is not limited to such a turbomachine structure and could apply to a turbomachine of different structure, for example to a turbofan 100 and twin-spool engine comprising a fan, as illustrated in FIG. 9.

The turbomachine 100 includes, from upstream to downstream in the direction of flow of the gas flows in the turbomachine, a fan 101, coupled to a gas turbine engine including a low pressure compressor 112, a high pressure compressor 113, an annular combustion chamber 114, a high pressure turbine 115 and a low pressure turbine 116.

The rotors of the high pressure compressor and the high pressure turbine are connected by a high pressure (HP) shaft 117 and together form a high pressure body. The rotors of the low pressure compressor and the low pressure turbine are connected by a low pressure (LP) shaft 118 and together form a low pressure body. The shafts HP and LP extend along a longitudinal axis X-X' of the turbomachine.

The fan shaft is directly or indirectly connected in rotation to the LP shaft 118.

The turbomachine also comprises a fan casing which extends around the vanes which is carried by aerodynamic arms, and which defines an air inlet duct for the flows. A portion of this air enters an internal annular duct of flow of a primary flow 120 and the other portion feeds an external annular duct of flow of a secondary flow 119. The duct passes through the compressors LP and HP, the combustion chamber, and the turbines HP and LP. The external duct envelops compressor casings and turbines and joins the internal duct at a nozzle of the turbomachine.

Thus, the ventilation air flow rate can be regulated using only the outlet pressure of the high pressure compressor and the pressure in the secondary duct.

The invention claimed is:

1. A turbofan engine with a longitudinal axis (X-X') comprising a primary duct in which there flows a primary flow at a primary pressure (P3) and a secondary duct which radially surrounds said primary duct and in which there flows a secondary flow (F2) at a secondary pressure (PS), said primary duct including at least one compressor configured to compress the primary flow, a turbine driving said compressor in rotation and a combustion chamber designed to receive, at an inlet, the primary air flow compressed by the compressor, said turbomachine further comprising a cooling circuit extending between the compressor and the turbine and in which flows a flow (F1) of cooling air taken from an outlet of the compressor and having as pressure the primary pressure (P3), wherein the cooling circuit comprises a device configured to regulate a cooling air flow rate arranged upstream of the turbine and comprising at least one valve that is configured to move between an open position and a closed position depending on a pressure difference (ΔP) between the pressure (P3) in the primary duct located between the compressor and the combustion chamber and the pressure (PS) in the secondary duct.

2. The turbomachine according to claim 1, wherein the air flow rate regulating device is configured to ensure a minimum air flow rate when the pressure difference (ΔP) between the pressure (P3) in the primary duct between the compressor and the combustion chamber and the pressure (PS) in the secondary duct is less than a threshold value (S1) and to ensure a maximum air flow rate when said pressure difference (ΔP) is greater than or equal to the threshold value (S1).

3. The turbomachine according to claim 1, wherein the air flow rate regulating device comprises an annular cowl configured to calibrate the cooling air flow rate mounted in the cooling circuit at a downstream end of said circuit upstream of a turbine rotor and integral with a stator portion of the turbomachine, the valve being mounted in said cowl.

4. The turbomachine according to claim 3, wherein the cowl comprises at least one longitudinal passage orifice opening into the cooling circuit, the valve being mounted downstream of said passage orifice.

5. The turbomachine according to claim 4, wherein the valve comprises a cylindrical housing, a cylinder movable in translation in said housing along an axis (X1-X1') parallel to the axis (X-X') of rotation of the turbine rotor, between the closed position of the valve wherein the cylinder closes the passage orifice and the open position of the valve wherein the cylinder allows the passage of an air flow through the passage orifice, said housing being connected to a secondary pressure supply (PS) tube opening into the secondary duct.

6. The turbomachine according to claim 5, wherein the valve comprises an elastic member configured to pre-load the cylinder in the closed position of the valve and housed in said housing and cooperating with a downstream end of the cylinder, said elastic member being dimensioned to prevent the translational movement of the cylinder in the closed position of the valve when the pressure difference (ΔP) between the pressure in the primary duct located between the compressor and the combustion chamber and the secondary pressure (PS) in the secondary duct is less than the threshold value (S1).

7. The turbomachine according to claim 5, wherein the cowl comprises an annular chamber into which the secondary pressure supply tube opens.

8. The turbomachine according to claim 7, wherein the flow rate regulating device further comprises at least one secondary pressure supply conduit connected to the annular distribution chamber and to the cylindrical housing of the valve.

9. The turbomachine according to claim 3, wherein the cowl further comprises a channel extending between the passage orifice and the turbine rotor to allow the passage of an air flow (F1) coming from the passage orifice towards said turbine rotor.

10. The turbomachine according to claim 3, wherein the cowl comprises a plurality of longitudinal passage orifices opening into the cooling circuit.

11. The turbomachine according to claim 10, wherein the air flow rate regulating device comprises a plurality of valves each configured to be actuated depending on the pressure difference (ΔP) between the pressure (P3) in the primary duct located between the compressor and the combustion chamber and the pressure (PS) in the secondary duct, each valve being mounted in the cowl downstream of an associated passage orifice.

12. The turbomachine according to claim 11, wherein the number of valves is less than the number of passage orifices.

13. The turbomachine according to claim 11, wherein the elastic members of the valves are identical to each other.

14. The turbomachine according to claim 3, wherein the turbine rotor comprises a turbine disc, at least one rotor blade mounted radially on the circumference of said turbine disc and a sealing disc having the general shape of an annular portion whose axis of symmetry is coaxial with the axis of rotation (X-X') of the rotor, arranged downstream and integral in rotation with said rotor disc.

15. The turbomachine according to claim 14, wherein the cowl further comprises a channel extending between the passage orifice and the turbine rotor to allow the passage of an air flow (F1) coming from the passage orifice towards said turbine, and the cooling circuit opens into a cooling volume (V) arranged between the sealing disc and the upstream surface of the turbine disc, the sealing disc comprising at least one ventilation orifice opening into the channel.

* * * * *